United States Patent
Liu

(10) Patent No.: US 8,661,239 B2
(45) Date of Patent: Feb. 25, 2014

(54) ENCRYPTION DEVICE AND METHOD FOR CONTROLLING DOWNLOAD AND ACCESS OPERATIONS PERFORMED TO A MOBILE TERMINAL

(75) Inventor: Ke Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,375

(22) PCT Filed: Apr. 28, 2010

(86) PCT No.: PCT/CN2010/072301
§ 371 (c)(1),
(2), (4) Date: May 3, 2012

(87) PCT Pub. No.: WO2010/145337
PCT Pub. Date: Dec. 23, 2010

(65) Prior Publication Data
US 2012/0246460 A1    Sep. 27, 2012

(30) Foreign Application Priority Data
Nov. 5, 2009  (CN) .......................... 2009 1 0237219

(51) Int. Cl.
*H04L 29/06* (2006.01)
(52) U.S. Cl.
USPC ................. 713/150; 713/169; 726/2; 726/18; 726/19; 726/26
(58) Field of Classification Search
USPC .................. 726/26; 713/150, 169; 326/47
See application file for complete search history.

(56) References Cited

U.S. PATENT DOCUMENTS 7,383,438 B2 *  6/2008  Fahrny et al. .................. 713/169
7,913,301 B2 *  3/2011  Walker et al. ................... 726/18
(Continued)

FOREIGN PATENT DOCUMENTS

| CN | 2160940 Y | 4/1994 |
|---|---|---|
| CN | 1248743 A | 3/2000 |

(Continued)

OTHER PUBLICATIONS

"A fully-integrated single-chip SOC for Bluetooth"; Eynde et al, Solid-State Circuits Conference, 2001. Digest of Technical Papers. ISSCC. 2001 IEEE International; IEEE 2001, p. 196-197, 446, conference publications.*

(Continued)

*Primary Examiner* — Taghi Arani
*Assistant Examiner* — Jason Lee
(74) *Attorney, Agent, or Firm* — Oppedahl Patent Law Firm LLC

(57) ABSTRACT

An encryption device and method for controlling download and access operations performed to a mobile terminal are disclosed. A switch circuit (102) is disposed on download channels (107, 108) between the master chip (101) of the mobile terminal and the connector (103) of the mobile terminal, an access software (105) is opened and an encryption chip (106) is accessed by using a dongle (112), the on-off of the switch circuit (102) is controlled by setting states of the encryption chip (106), so as to control the on-off of download channels (107, 108) to control the download and access operations performed to the mobile terminal by a computer (104). According to the device and method, hackers cannot crack the internal procedure of the memory of the mobile terminal using substitute code segments, thereby effectively improving the security and reliability of the download and access operations performed to the mobile terminal.

13 Claims, 2 Drawing Sheets

(56) References Cited

U.S. PATENT DOCUMENTS

2007/0200960 A1* 8/2007 Bennett et al. ............... 348/723
2009/0182911 A1* 7/2009 Krasner et al. ............... 710/63
2010/0085075 A1* 4/2010 Luzzi et al. ................... 326/8
2012/0263297 A1 10/2012 Bennett et al.

FOREIGN PATENT DOCUMENTS

| CN | 1101024 C | 2/2003 |
| CN | 2731839 Y | 10/2005 |
| CN | 101034425 A | 9/2007 |
| CN | 200990610 Y | 12/2007 |
| CN | 100473195 C | 3/2009 |
| CN | 101384042 A | 3/2009 |
| CN | 101488952 A | 7/2009 |
| EP | 998059 A1 * | 5/2000 |
| JP | 2008225672 A | 9/2008 |
| WO | 2005046233 A1 | 5/2005 |

OTHER PUBLICATIONS

International Search Report in international application No. PCT/CN2010/072301, mailed on Aug. 26, 2010.

English Translation of the Written Opinion of the International Search Authority in international application No. PCT/CN2010/072301, mailed on Aug. 26, 2010.

Supplementary European Search Report in European application No. 10788733.3, mailed on Jun. 11, 2013. (6 pages).

* cited by examiner

ENCRYPTION DEVICE AND METHOD FOR CONTROLLING DOWNLOAD AND ACCESS OPERATIONS PERFORMED TO A MOBILE TERMINAL

TECHNICAL FIELD

The disclosure relates to encryption technique of mobile terminals, and in particular to an encryption device and method for controlling download and access operations performed to a mobile terminal.

BACKGROUND

With the fast development of mobile terminal, the amount of mobile phone users is increased day by day. In order to prevent hackers from carrying out download operation on the mobile phone through a computer and from accessing the internal procedure of the memory of the mobile terminal by accessing the master chip of the mobile phone so as to crack the lock network locking card function of the mobile phone, the mobile phone usually needs to be protected through encryption added by a manufacturer.

In the prior art, Message-Digest Algorithm 5 (MD5) is usually adopted as cryptographic algorithm for carrying out encryption on the internal procedure of the memory of the mobile terminal. Since the cryptographic algorithm is an exhaustive encryption algorithm, when the mobile phone is turned on, the encrypted procedure is required to be decrypted before the mobile phone runs, which leads to long turn-on time of the mobile phone due to long decryption time. To reduce the turn-on time of the mobile phone, just a few important codes in the internal procedure of the memory of the mobile phone are encrypted under normal conditions. However, for the hackers familiar with the internal procedure of the memory of the mobile phone, the encrypted code segment is easily replaced by a substitute code segment to run the whole procedure, so that download and access operations performed to the mobile phone is performed by the computer through the connector of the mobile phone.

Another encryption manner combined with a platform is as follows: after the serial number of the chip of the mobile phone is bond with that of the memory of the mobile phone, a ciphertext is stored in the memory, and the serial numbers of the ciphertext are verified after every turn-on operation; if the serial numbers obtained after verifying are identical to that of the master chip of the mobile phone and that of the memory of the mobile phone, the procedure runs. However, the encryption manner is still adopted for the encryption of a few code segments, and similarly can be decrypted by the hackers; therefore, the security of the mobile phone is reduced.

The above encryption manners are both adopted for the encryption of a few code segments in the internal procedure of the memory of the mobile phone, and belong to software encryption manner; the encrypted procedure can be decrypted as long as the encrypted code segment is replaced by the substitute code segment by the hackers, and the download and access operations can be performed to the mobile phone through the connector of the mobile phone, so as to seriously influence the security of the mobile phone; therefore, it is especially important to look for a more high-effective encryption manner.

SUMMARY

Therefore, the main purpose of the disclosure is to provide an encryption device and method for controlling download and access operations performed to a mobile terminal, through which the encrypted code segments in the memory of the mobile terminal cannot be replaced, so that the security of the download and access operations performed to the mobile terminal is improved.

To achieve the purpose, following technical solutions of the disclosure are provided.

In one aspect, an encryption device for controlling download and access operations performed to a mobile terminal is provided, which includes a switch circuit and an encryption chip. The switch circuit is disposed on a download channel between a master chip of the mobile terminal and a connector of the mobile terminal and is configured to control an on-off of the download channel. The encryption chip is disposed on a mainboard of the mobile terminal and is configured to control an on-off of the switch circuit through states of the encryption chip.

Preferably, the switch circuit includes an N channel insulated gate field effect transistor, a drain electrode of the field effect transistor is connected with a read pin of the master chip of the mobile terminal through a pull-up resistor, a source electrode of the field effect transistor is connected with a read pin of the connector of the mobile terminal, and a gate electrode of the field effect transistor is connected with a control end of the encryption chip.

Preferably, the encryption chip has a protecting state and a non-protecting state. When the encryption chip is set to be in the protecting state, the control end of the encryption chip outputs a low electrical level, the switch circuit is open, and the download channel is disconnected; when the encryption chip is set to be in the non-protecting state, the control end of the encryption chip outputs a high electrical level, the switch circuit is closed, and the download channel is connected.

Preferably, a power supply source of the encryption chip is provided by an output power source of the master chip of the mobile terminal.

Preferably, the device further includes an access software and a dongle. The access software is connected with an external device and the encryption chip, through the access software, the external device accesses the encryption chip. The dongle is configured to protect access security of the access software.

In another aspect, an encryption method for controlling download and access operations performed to the mobile terminal is provided, which includes the following steps: disposing a switch circuit on a download channel between a master chip of the mobile terminal and a connector of the mobile terminal, and connecting or disconnecting the download channel by controlling an on-off of the switch circuit according to states of an encryption chip.

Preferably, before setting the state of the encryption chip, the method further includes the following steps: the external device opens an access software through a dongle, accesses the encryption chip through the access software, and sets the state of the encryption chip.

Preferably, the switch circuit includes an N channel insulated gate field effect transistor, a drain electrode of the field-effect transistor is connected with a read pin of the master chip of the mobile terminal through a pull-up resistor, a source electrode of the field effect transistor is connected with the read pin of the connector of the mobile terminal, and a gate electrode of the field effect transistor is connected with a control end of the encryption chip.

Preferably, the step of controlling the on-off of the switch circuit according to states of the encryption chip includes that: when the encryption chip is set to be in a protecting state, a control end of the encryption chip outputs a low electrical level, the switch circuit is open, and the download channel is disconnected; when the encryption chip is set to be in a non-protecting state, a control end of the encryption chip outputs a high electrical level, the switch circuit is closed, and the download channel connected.

Preferably, a power supply source of the encryption chip is provided by an output power source of the master chip of the mobile terminal.

According to the encryption device and method for controlling download and access operations of the mobile terminal, a switch circuit is disposed on the download channel between the master chip of the mobile terminal and the connector of the mobile terminal, the access software is opened and the encryption chip is accessed by using the dongle, the on-off of the switch circuit is controlled by setting states of the encryption chip, so as to control the on-off of the download channel to achieve the purpose for controlling the download and access operations performed to the mobile terminal by a computer.

According to the device and method of the disclosure, the mobile terminal is encrypted for protection, through a combination of hardware encryption and software encryption, so that it is impossible for hackers to replace and crack the encryption procedure of the memory of the mobile terminal using substitute code segments, so as to effectively improve the security and reliability of the download and access operations performed to the mobile terminal.

DETAILED DESCRIPTION

The main idea of the disclosure is that: a switch circuit is disposed on the download channel between the master chip of the mobile terminal and the connector of the mobile terminal, and the on-off of the switch circuit is controlled through the states of the encryption chip to control the on-off of the download channel so as to control the download and access operations performed to the mobile terminal by the external device, thereby improving the security and reliability of the mobile terminal.

The device and method of the disclosure are detailed below in conjunction with the specific embodiment. In the embodiment, the mobile terminal is a mobile phone.

Figure 1:
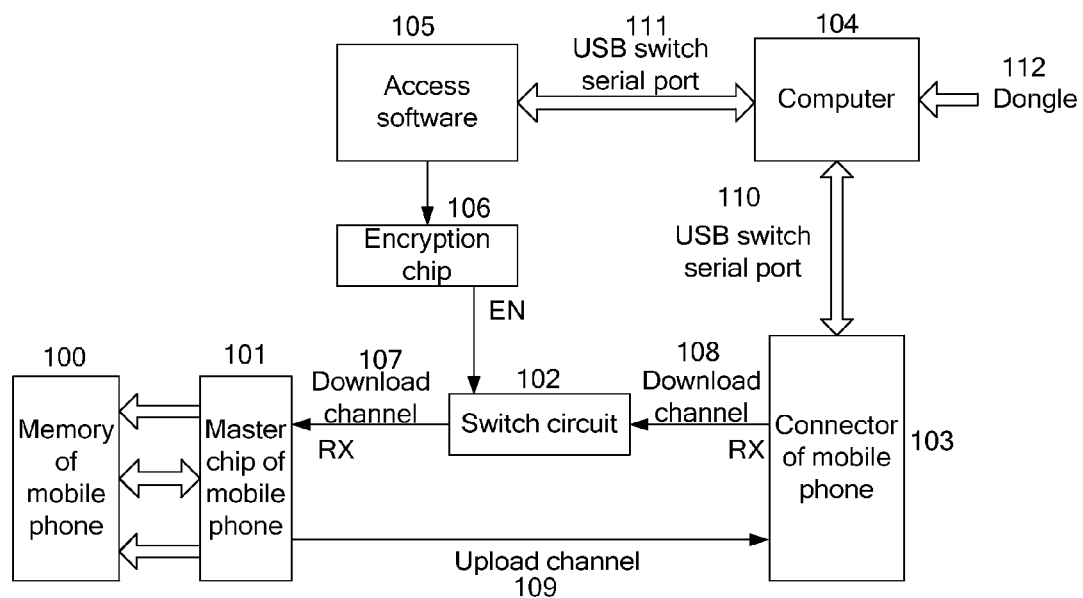
FIG. 1 shows a structural diagram of an encryption device for controlling download and access operations performed to the mobile terminal of the disclosure.

According to the present disclosure, the encryption device for controlling the download and access operations performed to the mobile terminal, as shown in FIG. 1, includes a switch circuit and an encryption chip.

The switch circuit is disposed on a download channel between the master chip of the mobile terminal and the connector of the mobile terminal and is configured to control the on-off of the download channel; that is, when the switch circuit is closed, the download channel is connected; when the switch circuit is open, the download channel is disconnected.

According to the PN junction characteristic of semiconductor, field effect transistor can be divided into P channel field effect transistor and N channel field effect transistor. In the embodiment, the switch circuit comprises an N channel insulated gate field effect transistor (MOS transistor, for short); the MOS transistor has three electrodes of source electrode S, drain electrode D and gate electrode G which are respectively S electrode, D electrode and G electrode for short. The D electrode of the MOS transistor is connected with the read pin RX of the master pin of the mobile phone through a pull-up resistor; the S electrode of the MOS transistor is connected with the read pin RX of the connector of the mobile phone; and the G electrode of the MOS transistor is connected with the control end EN of the encryption chip. The on-off of the switch circuit is controlled through the output level of the control end EN of the encryption chip so as to control the on-off of the download channel.

When the control end EN outputs a high electrical level, that is, when the G electrode has a high electrical level, the MOS transistor is turned on, the switch circuit is closed, the download channel between the master chip of the mobile phone and the connector of the mobile phone is connected, and the external device such as the computer can perform download and access operations to the mobile phone. When the control end EN outputs a low electrical level, that is, the G electrode has a low electrical level, the MOS transistor is turned off, the switch circuit is open, the download channel between the master chip of the mobile phone and the connector of the mobile phone is disconnected, and the external device such as the computer cannot perform download or access operations to the mobile phone. The resistance value of the pull-up resistor is not specially limited, but the D electrode could produce relatively large sink current if the resistance value is too small so as to cause influence on the switch circuit; preferably, the resistance value of the pull-up resistor is 100 kilohms.

The encryption chip is disposed on the mainboard of the mobile phone for controlling the on-off of the switch circuit through the states of the encryption chip.

Here, the control end EN of the encryption chip is connected with the G electrode of the MOS transistor, and the output level of the control end EN of the encryption chip is controlled through the states of the encryption chip so as to control the on-off of the switch circuit. The state of the encryption chip can be set to be a protecting state and a non-protecting state; when the encryption chip is set to be in the protecting state, the control end EN of the encryption chip outputs a low electrical level, the switch circuit is open; when the encryption chip is set to be in non-protecting state, the control end EN of the encryption chip outputs a high electrical level, the switch circuit is closed. The power supply source of the encryption chip is provided by the output power source of the master chip of the mobile phone, so as to guarantee that the encryption chip is simultaneously powered on when the master chip of the mobile phone is powered on, no matter the information saved on the mobile phone is downloaded or accessed.

In the disclosure, a control procedure programmed in advance in the computer is downloaded inside the encryption chip through a special download wire for the encryption chip so as to control the state of the encryption chip; moreover, the state of the encryption chip can be modified by modifying the key of the encryption chip. The control procedure is used for controlling the state of the encryption chip; the control procedure also needs to be encrypted for protection; and the encryption manner can be an exhaustive encryption manner in the prior art without description here in detail. The control procedure after being encrypted for protection is programmed independently and is completely independent of the internal procedure of the memory of the mobile phone, and is not easy to be obtained and cracked by the hackers.

The device further includes a dongle and an access software.

The dongle is a special tool for opening the access software by the computer and is used the access software in order to protect the access security of the access software; and the access software can be opened just by inserting the dongle into the computer and then inputting correct passwords.

The access software is a special access tool for the encryption chip and is used with the encryption chip and the dongle for accessing the encryption chip. The control procedure programmed in advance in the computer is downloaded inside the encryption chip through the special download wire for the encryption chip after the access software is opened through the dongle by the computer, or the state of the encryption chip is set by modifying the key of the encryption chip.

Figure 2:
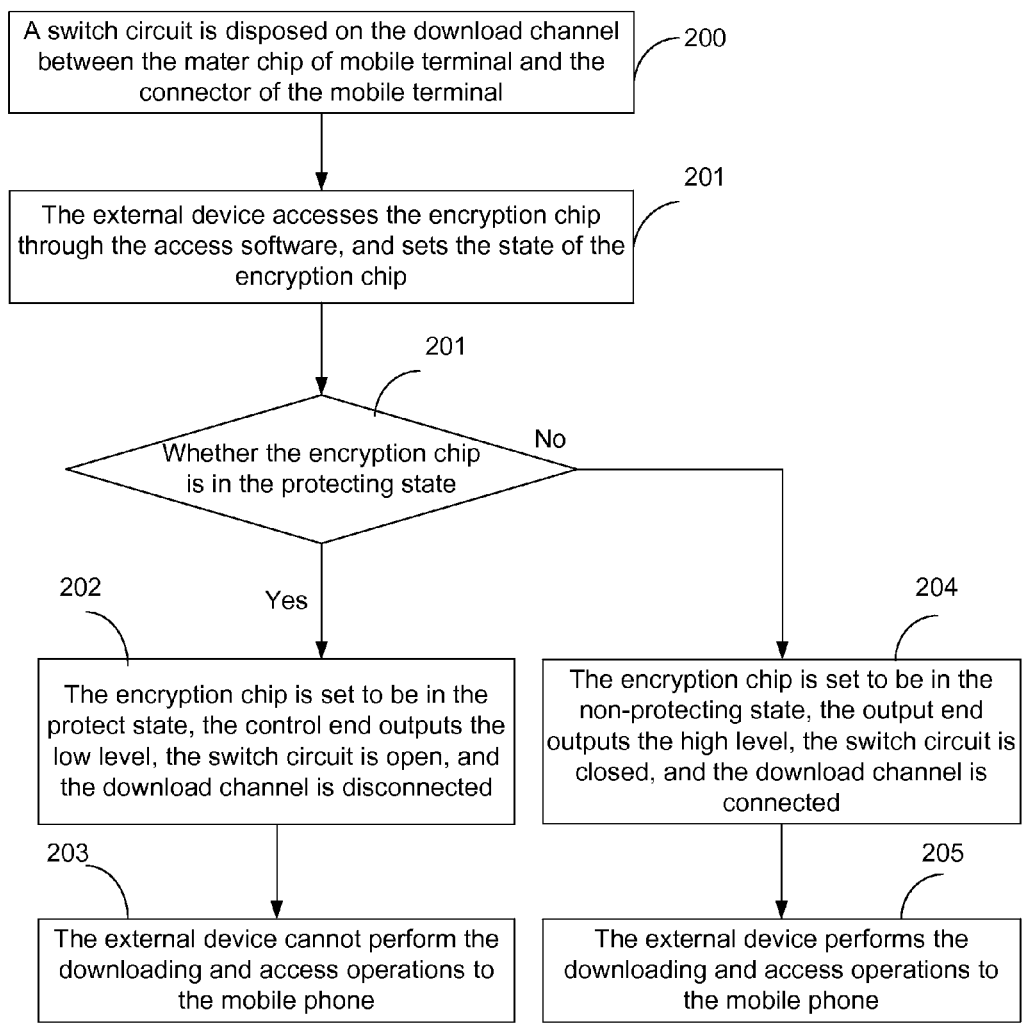
FIG. 2 shows a flowchart of an encryption method for controlling download and access operations performed to the mobile terminal of the disclosure.

Based on the device, the disclosure provides an encryption method for controlling the download and access operations to the mobile terminal. as shown in FIG. 2, the method comprises the following steps.

Step 200: A switch circuit is disposed on the download channel between the master chip of the mobile terminal and the connector of the mobile terminal.

In the step, the switch circuit consists of an N channel insulated gate field effect transistor (MOS transistor, for short); the MOS transistor has three electrodes of source electrode S, drain electrode D and gate electrode G which are respectively S electrode, D electrode and G electrode for short. The D electrode of the MOS transistor is connected with the read pin RX of the master pin of the mobile phone through a pull-up resistor; the S electrode of the MOS transistor is connected with the read pin RX of the connector of the mobile phone; and the G electrode of the MOS transistor is connected with the control end EN of the encryption chip. The on-off of the switch circuit is controlled through the output level of the control end EN of the encryption chip so as to control the on-off of the download channel.

When the control end EN outputs a high electrical level, that is, when the G electrode has a high electrical level, the MOS transistor is turned on, the switch circuit is closed, the download channel between the master chip of the mobile phone and the connector of the mobile phone is connected, and the external device such as the computer can perform download and access operations to the mobile phone. When the control end EN outputs a low electrical level, that is, the G electrode has a low electrical level, the MOS transistor is turned off, the switch circuit is open, the download channel between the master chip of the mobile phone and the connector of the mobile phone is disconnected, and the external device such as the computer cannot perform download and access operations to the mobile phone. The resistance value of the pull-up resistor is not specially limited, but the electrode could produce relatively large sink current if the resistance value is too small so as to cause influence on the switch circuit; preferably, the resistance value of the pull-up resistor is 100 kilohms.

Step 201: An external device accesses the encryption chip through an access software, and sets the state of the encryption chip; determining whether the encryption chip is set to be in the protecting state, Step 202 is performed when the encryption chip is set to be in the protecting state; and Step 204 is performed when the encryption chip is set to be in the non-protecting state;

in the step, the external device, such as a computer, accesses the encryption chip through the access software so as to set the state of the encryption chip. The dongle is a special tool for opening the access software by the computer in order to protect the access security of the access software; and the access software can be opened just by inserting the dongle into the computer and then inputting correct passwords so as to access the encryption chip. If the dongle is not inserted in the computer, the access software cannot be opened, and the encryption chip also cannot be accessed. Under normal conditions, the dongle cannot be obtained and cracked easily by the hackers, so the access security and reliability of the access software can be guaranteed.

The control procedure programmed in advance in the computer is downloaded inside the encryption chip through the special download wire for the encryption chip after the access software is opened through the dongle by the compute. The control procedure is used for controlling the state of the encryption chip. The control procedure also needs to be encrypted for protection; and the encryption manner can be an exhaustive encryption manner in the prior art without description here in detail. The control procedure after being encrypted for protection is programmed independently and is completely independent of the internal procedure of the memory of the mobile phone, and cannot be obtained and cracked easily by the hackers.

Moreover, the state of the encryption chip can be modified through the key of the encryption chip. The state of the encryption chip can be set to be the protecting state or the non-protecting state. When the encryption chip is in the protecting state, the control end EN of the encryption chip outputs a low electrical level; when the encryption chip is in the non-protecting state, the control end EN of the encryption chip outputs a high electrical level. After the configuration of the state of the encryption chip is finished, the download wire can be pulled out to quit the access software and the dongle; the encryption chip is disconnected with the computer so that a person without the dongle cannot modify the control procedure inside the encryption chip so as to achieve the protection function for the state of the encryption chip.

Here, a USB signal is converted into a RS232 serial signal through a USB switch serial port for realizing data transmission when the encryption chip is accessed through the special download wire by the computer. When the encryption chip is in the protecting state, the Step 202 is performed; when the encryption chip is in the non-protecting sate, the Step 204 is performed.

Steps 202-203: the encryption chip is set to be in the protecting state, the control end outputs a low electrical level, the switch circuit is open, the download channel is disconnected, the external device cannot perform the download and access operations to the mobile phone, and the current processing procedure is completed.

In the embodiment, the power supply source of the encryption chip is provided by the output power source of the master chip of the mobile phone, thus the encryption chip can be powered on simultaneously when the master chip of the mobile phone is powered on no matter the information saved on the mobile phone is downloaded or accessed, so as to control the on-off of the download channel in order to achieve the protection function for the master chip.

In the step, when the master chip of the mobile phone is powered on, the encryption chip is powered on simultaneously. When the encryption chip is set to be in the protecting state, the control end EN of the encryption chip outputs a low electrical level; since the control end EN is connected with the G electrode of the MOS transistor, the G electrode of the MOS transistor is also at a low electrical level; the MOS transistor is turned off, the switch circuit is open, and the download channel between the master chip of the mobile phone and the connector of the mobile phone is turned off. The external device, such as the computer, cannot carry out download operation to the mobile phone through the connector of the mobile phone, and cannot access the master chip of the mobile phone through the connector of the mobile phone so as to access the internal procedure of the memory of the mobile phone.

Under normal conditions, the encryption chip is in the protecting state when the mobile phone leaves the factory in order to prevent others from carrying out download operation to the mobile phone at random and from accessing the master chip of the mobile phone at random without permission so as to access the internal procedure of the memory of the mobile phone.

Steps 204-205: the encryption chip is set to be in the non-protecting state, the control end outputs a high electrical level, the switch circuit is closed, the download channel is connected, and the external device can perform the download and access operations to the mobile phone.

In the step, when the encryption chip is in the non-protecting state, the control end EN of the encryption chip outputs the high electrical level, that is, the G electrode of the MOS transistor is at the high electrical level, the MOS transistor is turned on, the switch circuit is closed, and the download channel between the master chip of the mobile phone and the connector of the mobile phone performs data transmission through RS232 serial signals.

In the embodiment, if the state of the encryption chip needs to be modified, from the protecting state to the non-protecting state, or from the non-protecting state to the protecting sate, the dongle is required to be inserted in the external device, such as the computer, again and then correct passwords are input, and the access software is opened. The encryption chip is accessed by the computer through the special download wire for the encryption chip, and the key of the encryption chip is modified in order to reset the sates of the encryption chip; the download wire can be pulled out after the setting is completed, and the access software and the dongle are quit in order to protect the state of the encryption chip from being modified by others.

Moreover, the switch circuit of the disclosure is disposed on the download channel of the master chip and the connector of the mobile phone so as to just control the on-off of the download channel. Therefore, the mobile phone is protected only when the external device, such as the computer, performs download and access operations to the mobile phone. The mobile phone is not damaged when the mater chip of the mobile phone uploads data to the computer through the connector of the mobile phone, thus no switch circuit is disposed on the upload channel between the mater chip of the mobile phone and the connector of the mobile phone.

The above is only the preferred embodiment of the disclosure and not intended to limit the scope of protection of the disclosure. Any modifications, equivalent replacements, improvements without departing from the spirit and principle of the disclosure shall fall within the scope of protection of the disclosure.

The invention claimed is:

1. An encryption device for controlling download and access operations performed to a mobile terminal, comprising: a switch circuit and an encryption chip, wherein, the switch circuit is disposed on a download channel between a master chip of the mobile terminal and a connector of the mobile terminal and is configured to control an on-off of the download channel, and the encryption chip is disposed on a mainboard of the mobile terminal and is configured to control an on-off of the switch circuit through states of the encryption chip; wherein the encryption chip has a protecting state and a non-protecting state;

when the encryption chip is set to be in the protecting state, the control end of the encryption chip outputs a low electrical level, the switch circuit is open, and the download channel is disconnected; when the encryption chip is set to be in the non-protecting state, the control end of the encryption chip outputs a high electrical level, the switch circuit is closed, and the download channel is connected.

2. The encryption device according to claim 1, wherein the switch circuit comprises an N channel insulated gate field effect transistor, a drain electrode of the field effect transistor is connected with a read pin of the master chip of the mobile terminal through a pull-up resistor, a source electrode of the field effect transistor is connected with a read pin of the connector of the mobile terminal, and a gate electrode of the field effect transistor is connected with a control end of the encryption chip.

3. The encryption device according to claim 1, wherein a power supply source of the encryption chip is provided by an output power source of the master chip of the mobile terminal.

4. The encryption device according to claim 1, further comprising an access software and a dongle; wherein,
the access software is connected with an external device and the encryption chip, through which the external device accesses the encryption chip, and
the dongle is configured to protect access security of the access software.

5. An encryption method for controlling download and access operations performed to the mobile terminal, comprising:
disposing a switch circuit on a download channel between a master chip of the mobile terminal and a connector of the mobile terminal; and
connecting or disconnecting the download channel by controlling an on-off of the switch circuit according to states of an encryption chip;
wherein controlling the on-off of the switch circuit according to states of the encryption chip comprises: when the encryption chip is set to be in a protecting state, a control end of the encryption chip outputting a low electrical level, the switch circuit being open, and the download channel being disconnected; when the encryption chip is set to be in a non-protecting state, the control end of the encryption chip outputting a high electrical level, the switch circuit being closed, and the download channel being connected.

6. The encryption method according to claim 5, further comprising steps, preceding the step of setting the states of the encryption chip, of: opening, by an external device, an access software through a dongle, accessing the encryption chip through the access software, and setting the states of the encryption chip.

7. The encryption method according to claim 5, wherein the switch circuit comprises an N channel insulated gate field effect transistor, a drain electrode of the field effect transistor is connected with a read pin of the master chip of the mobile terminal through a pull-up resistor, a source electrode of the field effect transistor is connected with a read pin of the connector of the mobile terminal, and a gate electrode of the field effect transistor is connected with a control end of the encryption chip.

8. The encryption method according to claim 5, wherein a power supply source of the encryption chip is provided by an output power source of the master chip of the mobile terminal.

9. The encryption device according to claim 1,
wherein a power supply source of the encryption chip is provided by an output power source of the master chip of the mobile terminal.

10. The encryption device according to claim 2, further comprising an access software and a dongle; wherein,
the access software is connected with an external device and the encryption chip, through which the external device accesses the encryption chip, and
the dongle is configured to protect access security of the access software.

11. The encryption device according to claim 1, further comprising an access software and a dongle; wherein, the access software is connected with an external device and the encryption chip, through which the external device accesses the encryption chip, and the dongle is configured to protect access security of the access software.

12. The encryption method according to claim 6, wherein controlling the on-off of the switch circuit according to states of the encryption chip comprises: when the encryption chip is set to be in a protecting state, a control end of the encryption chip outputting a low electrical level, the switch circuit being open, and the download channel being disconnected; when the encryption chip is set to be in a non-protecting state, the control end of the encryption chip outputting a high electrical level, the switch circuit being closed, and the download channel being connected.

13. The encryption method according to claim 7, wherein controlling the on-off of the switch circuit according to states of the encryption chip comprises: when the encryption chip is set to be in a protecting state, a control end of the encryption chip outputting a low electrical level, the switch circuit being open, and the download channel being disconnected; when the encryption chip is set to be in a non-protecting state, the control end of the encryption chip outputting a high electrical level, the switch circuit being closed, and the download channel being connected.

* * * * *